United States Patent Office
3,146,137
Patented Aug. 25, 1964

3,146,137

SMOOTH EPITAXIAL COMPOUND FILMS HAVING A UNIFORM THICKNESS BY VAPOR DEPOSITING ON THE (100) CRYSTALLOGRAPHIC PLANE OF THE SUBSTRATE

Forrest V. Williams, Ballwin, Mo., assignor to Monsanto Company, St. Louis, Mo., a corporation of Delaware
No Drawing. Filed July 13, 1962, Ser. No. 209,776
6 Claims. (Cl. 148—175)

The present invention relates to a means for the provision of improved epitaxial films.

More particularly, this invention provides improved epitaxial films formed from elements of Groups IIIB and VB, e.g., the phosphides, arsenides and antimonides of boron, aluminum, gallium, indium and mixtures thereof on seed crystal substrates selected from the same class of compounds comprising the epitaxial films.

It is an object of this invention to provide a means for the obtention of epitaxial films which are characterized as having superior physical properties and reproducibility. The epitaxial films according to the present invention are further characterized as having a high degree of mirror polish and film thickness uniformity.

A further object of this invention is the provision of a means for upgrading the reproducibility of electronic devices utilizing semiconductor components.

A still further object of this invention is the provision of a means for achieving the foregoing objects without reliance upon any particular process for producing epitaxial films. Further objects and advantages of the invention will become apparent as the description proceeds.

In the fabrication of electronic devices utilizing epitaxially-filmed semiconductors, it is highly desirable to have semiconductor components with reproducible characteristics. The reproducible characteristics can best be achieved by providing epitaxial films which are smooth and of uniform thickness.

To accomplish this desideratum of reproducibility in epitaxial films, prior efforts were directed primarily to the ascertainment of the control variables necessary to obtain smooth and uniform films. Such efforts include temperature controls within the reaction and/or deposition zones, reactant concentration, flow rates and residence times in the reactor. The results of these efforts were that the epitaxially-filmed product had varying degrees of polished or smoothness and thickness uniformity ranging from fairly good to unuseable. As a result, electronic devices utilizing these components have a high incidence of non-reproducible characteristics.

According to the present invention it has been discovered that operable epitaxially-filmed semiconductor components may be produced when the substrate seed crystal is oriented in any direction with respect to the deposited film, i.e., any of the (100), (110), (111)A, (111)B, (112), (113), (114), etc., crystallographic planes may be exposed. The (111)B crystal face is the (111) face having the Group V element exposed, e.g., in gallium arsenide the (111)B face has arsenic atoms exposed, whereas the (111)A face has gallium atoms exposed. However, epitaxial films having the desired superior characteristics are produced only when the seed crystal has a definite, specific orientation with respect to the deposited film. More particularly, it has been found that the improved epitaxial films of this invention having excellent polish, thickness uniformity and reproducibility are produced only when the (100) crystallographic plane, or face, is exposed. When crystal faces other than the (100) are employed, e.g., the (110) or the (111)A, the epitaxial films deposited on them are more rough, non-uniform in thickness and far less reproducible.

In fact, even when using the (100) crystal face exposure, misorientations of as little as 0.5 degree from the (100) plane give rise to detectable structural features on the surface of the epitaxial film. Consequently, deviations or misorientations from the precise (100) plane are to be avoided.

A further significance of the present invention is that in addition to the provision of superior products obtained hereby, these products are not limited to any specific process or apparatus for their obtention. Hence, one desiring to practice this invention is not limited to a single process, or apparatus but may select any one of several methods for producing epitaxial films of the above-described compounds so long as the requisite of the present invention is observed, viz., that the seed crystal substrate be oriented in the (100) crystal face exposure.

In the present invention it is not particularly material how the reaction mixture comprising the elements from which the epitaxial film is deposited, is provided. Substantially any process which is adapted to the production of epitaxial films of the instant compounds is suitable for the production of the superior products of the instant invention. The broad applicability of the present discovery will be apparent from the illustrative examples presented below.

The characteristic feature of epitaxial film formation is that starting with a given substrate material, e.g., gallium arsenide, having a certain lattice structure and oriented in any direction, a film, layer or overgrowth of the same or different material may be vapor deposited upon the substrate. The vapor deposit has an orderly atomic lattice and assumes the same lattice structure and geometric configuration as the substrate. When using a certain material, e.g., gallium arsenide, as the substrate and another material, e.g., indium phosphide as the film deposit it is necessary that the lattice distances of the deposited material closely approximate those of the substrate in order to obtain an epitaxial film. In this connection, it is pointed out that crystal lattice "mismatches" up to about 40% are tolerable. That is, while, preferably, the crystal lattice of the epitaxial film approximate closely that of the seed crystal substrate, still, epitaxial films are successfully prepared when the crystal lattice spacings of the film and substrate differ by up to 40%.

As stated hereinbefore the epitaxial films formed in accordance with this invention comprise compounds formed from elements of Group IIIB of the periodic system and elements selected from Group VB. Included in this group of compounds are the phosphides, arsenides and antimonides of boron, aluminum, gallium, indium and mixtures thereof. The bismuthides and thallium compounds, while operable, are less suitable. Preferred compounds within this group include gallium arsenide, gallium phosphide, aluminum arsenide, aluminum phosphide, indium phosphide, and indium arsenide. In addition to the use of the above compounds by themselves, mixtures of these compounds are also contemplated as epitaxial films, e.g., aluminum phosphide and indium antimonide mixed in varying proportions when produced according to the instant invention, produce suitable semiconductor compositions.

Other combinations of elements within the above group which are suitable herein include ternary, and quaternary compositions or mixed binary crystals, such as combinations having a formulae $GaAs_xP_{1-x}$, $InAs_xP_{1-x}$, $$AlP_xAs_{1-x},$$

$Ga_xIn_{1-x}As$, $Ga_xIn_{1-x}P$, $In_xGa_{1-x}Sb$, $Ga_xAl_{1-x}P$ and $Ga_yIn_{1-y}As_xP_{1-x}$, where $x$ and $y$ have a numerical value greater than zero and less than 1.

Materials useful as substrates herein include the same materials used in the epitaxial films as just described. Suitable dimensions of the seed crystal are 1 mm. thick, 10 mm. wide and 15–20 mm. long, although larger or smaller crystals may be used.

As will be described hereinafter, the materials used herein either as films or substrates or both may be used in a purified state or containing small amounts of foreign materials as "doping" agents.

The significance of structures having epitaxial films is that electronic devices utilizing "surface junctions" may be readily be fabricated. Devices utilizing n-p or p-n junctions are readily fabricated by vapor depositing the host material containing the desired amount and kind of impurity, hence, conductivity type, upon a substrate having a different conductivity type. In order to obtain a vapor deposit having the desired conductivity type and resistivity, trace amounts of an impurity, e.g., an element or compound thereof selected from Group II of the periodic system, e.g. beryllium, magnesium, zinc, cadmium and mercury are incorporated into the reaction components in order to provide p-type conductivity, and tin or a tin compound such as tin tetrachloride or an element from Group VI, e.g., sulfur, selenium and tellurium, to produce n-type conductivity. These "impurities" are carried over with the reactant materials in the vapor phase and deposited in a uniform dispersion in the epitaxial film of the formed product on the substrate. Since the proportion of dopant deposited in the epitaxial film is not necessarily equal to the proportion in the reactant gases the quantity of dopant added corresponds to the level of carrier concentration desired in the epitaxial film to be formed.

The doping element may be introduced in any manner known to the art, for example, by chemical combination with or physical dispersion within the reactants. Other examples include adding volatile dopant compounds such as tin tetrachloride to the Group IIIB and/or VB components, or the dopant can be added with a separate stream of hydrogen.

The substrate materials used herein may be doped by conventional means known to the art. For example, the doping agent may be introduced in elemental form or as a volatile compound of the dopant element during preparation of the substrate crystal in the same manner described above for doping the epitaxial film. Also, the dopant may be added to a melt of the substrate compound during crystal growth of the compound. Another method of doping is by diffusing the dopant element directly into the substrate compound at elevated temperatures.

The quantity of dopant used will be controlled by the electrical properties desired in the final product. Suitable amounts contemplated herein range from $1 \times 10^{15}$ to $5 \times 10^{20}$ atoms/cc. of product.

Vapor deposits of the purified material having the same conductivity type as the substrate may be utilized to form intrinsic pp+ or nn+ regions.

Variations of the preceding techniques permit the formation of devices having a plurality of layers of epitaxial films each having its own electrical conductivity type and resistivity as controlled by layer thickness and dopant concentration. Since the vapor deposited material assumes the same lattice structure as the substrate wherever the two materials contact each other, small or large areas of the substrate may be masked from or exposed to the depositing host material. By this means one is able to obtain small regions of surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., gallium arsenide, is vapor deposited upon a substrate of gallium arsenide having a different conductivity type. Subsequently, a quantity of the same material with different doping agents or different concentrations of the same dopant or another of the described materials, e.g., indium phosphide, may be vapor deposited from starting materials comprising these elements as a second epitaxial film over the epitaxial film of gallium arsenide already deposited on the substrate. This procedure with any desired combination of epitaxial and non-epitaxial layers may be repeated any number of times.

Alternatively, after the first layer of material is vapor deposited upon the substrate, the substrate with this epitaxial layer is removed to another reaction tube and a second material is then vapor deposited as before upon the substrate with its first epitaxial layer, thereby forming a two-layered component.

In each of these processes, thickness of the film and the impurity concentration are controllable to obtain a variety of electrical effects required for specific purposes.

The broad applicability of the present invention wherein the substrate seed crystal has a (100) crystal face exposure may be shown with reference to the variety of processes which are applicable or suitable for the production of the superior epitaxial films of this invention. For example, one process involves the hydrogen halide transport of a crude form of a compound selected from the above class of materials located in one temperature zone to a second temperature zone having a different temperature level. For example, when gallium arsenide is reacted with a hydrogen halide, for example, hydrogen chloride, hydrogen bromide or hydrogen iodide, a complex mixture is formed the vapor of which is then conducted to a cooler zone wherein the original gallium arsenide is reconstituted or reformed and deposits in a very pure single crystal form upon a seed crystal of gallium arsenide oriented in the aforementioned position. Another process to which this invention is applicable involves the reaction of a volatile Group III element such as the halides of boron, aluminum, gallium and indium with a Group V element such as phosphorus, arsenic and antimony in the presence of hydrogen. Still another process involves the reaction of a volatile Group III compound and a volatile Group V compound in the presence of hydrogen. Still another process involves contacting a gaseous reaction mixture of hydrogen halide and a Group III element to form a mixture comprising hydrogen halide and a Group III halide with a gaseous mixture of hydrogen and a Group V element or volatile Group V compound, such as a halide, wherein the III–V compound is deposited as an epitaxial film on a seed crystal substrate oriented in the manner described above. In each of the foregoing processes a reaction mixture comprising a III–V compound and various reaction products is formed from which the III–V compound is deposited as an epitaxial film. Hence, it will be seen that the particular method by which the vapor phase reaction mixture is prepared is not an essential part of this invention. The critical consideration in each of these processes for the preparation of a superior epitaxial film is that the seed crystal substrate be oriented in such manner that only the (100) crystallographic face is exposed to the gaseous reaction mixture from which the epitaxial film is deposited. The invention will be more fully understood with reference to the following illustrative specific embodiments:

*Example I*

This example illustrates the formation and deposition of an epitaxial film of n-type gallium arsenide on p-type gallium arsenide as a substrate oriented (100). The experimental arrangement in this example is such that a fused silica reaction tube is positioned in two furnaces butted end to end. In one end of the silica tube is placed 8.45 g. of polycrystalline n-type, undoped gallium arsenide. In the other end of the fused silica tube was placed a seed wafer substrate of single crystal p-type gallium arsenide oriented in such manner that the (100) crystallographic face is exposed to the reaction mixture from which an epitaxial film is to be deposited. The seed crystal weighed 0.1489 g. prior to the run. By means of the two furnaces the fused silica tube was heated in such manner that the polycrystalline gallium arsenide source material was heated to a temperature of 890° C. while that portion of the silica tube holding the gallium arsenide seed crystal was maintained at about 770–780° C.

A stream of hydrogen gas was passed through the reaction and deposition zones at a rate of about 97 cc./min. during the period when the reaction zone was heating up to reaction temperatures. The hydrogen served to flush impurities such as oxygen from the system and from the surface of the seed crystal substrate. When the temperatures within the reaction and deposition zones had reached the desired levels a stream of hydrogen chloride was introduced into the hydrogen stream at a rate of 10 cc./min. and this mixture was passed over the gallium arsenide source material and seed crystal. The hydrogen does not react with the source material, but functions as a diluent for the hydrogen halide and, also tends to moderate or inhibit the reaction of the hydrogen chloride with the source material, since hydrogen is one of the products of the reversible reaction taking place. The chemical reaction involved is shown by the following equation, using gallium arsenide and hydrogen chloride for illustration:

$$GaAs + HCl \underset{}{\overset{>700^\circ C.}{\rightleftharpoons}} GaCl + \tfrac{1}{4}As_4 + \tfrac{1}{2}H_2$$

hydrogen halide and hydrogen flow rates of from 1 cc./min. to 1000 cc./min. are suitable, however, best results are obtained when hydrogen flow rates are greater than hydrogen halide flow rates, e.g., by using reduced hydrogen halide/hydrogen ratios. These ratios range from 1:10 cc./min. to 1:1000 cc./min. and, preferably, from 1:50 cc./min. to 1:500 cc./min. After the reaction and deposition had proceeded for about 45 minutes, the hydrogen chloride flow was terminated, but the hydrogen flow was continued while the system cooled.

The seed crystal was then reweighed and found to be increased by 0.0099 g. This increase represents the amount of gallium arsenide deposited upon the seed crystal.

Upon examination, the product was found to have a very smooth and uniform surface film which was 17.5 microns thick and having a high mirror polish. X-ray diffraction patterns showed that the film was single crystal and oriented in the same manner as the single crystal gallium arsenide substrate. Point contact rectification tests showed that a p-n junction with very sharp breakdown existed between the film and substrate.

Electrical measurements of the film indicated a mobility of 6600 and resistivity of 0.139 ohm/cm. In a duplicate run of this process, the film had a mobility of 4677 and resistivity of 0.137 ohm/cm.

As an illustration of the superior product obtained by using the (100) orientation, a run identical to that described in this example was made using, however, a gallium arsenide seed crystal oriented (111)B. This orientation was selected for comparative purposes since it produces better films than the other aforementioned crystal orientations. Electrical measurements on the film deposited on the (111)B crystal face showed a mobility of 4457 and a resistivity of $4.05 \times 10^{-2}$ ohm/cm. A duplicate run was also made and the film showed a mobility of 4189 and a resistivity of $2.93 \times 10^{-2}$ ohm/cm.

In still another set of identical comparative runs, the film deposited on a (100) oriented gallium arsenide seed crystal showed a mobility of 5196 and a resistivity of 0.192 ohm/cm., as against a mobility of 4469 and resistivity of $2.15 \times 10^{-2}$ ohm/cm. in the film deposited on a (111)B oriented seed crystal.

As mentioned previously, the epitaxial films of the present invention are characterized as having a high degree of thickness uniformity. Fine measurements of epitaxial film uniformity may be made rapidly, accurately and non-destructively by infrared interference techniques. Another useful method of measuring film thickness involves cleavage and junction staining techniques. However, a more rapid gross measure of film thickness uniformity may be made visually by reference to film surface imperfections. These surface imperfections, which cause variation in deposition thickness, are usually pyramidally-shaped bumps. An index of the uniformity of epitaxial layer thickness is the number of the surface imperfections per unit area.

In order to illustrate the superiority of the film thickness uniformity in the epitaxial films of the present invention, a seed crystal of gallium arsenide oriented (100) was placed side by side with a seed crystal of gallium arsenide oriented (111)B in the deposition zone described above. An epitaxial layer of gallium arsenide was then deposited on each of these seed crystals simultaneously according to the method of Example I. Upon termination of the run, the two samples were examined for surface imperfections, and it was found that the epitaxial film deposited on the (111)B-oriented seed crystal had 180 imperfections per cc., whereas the film deposited on the seed crystal oriented (100) had only 18 imperfections per cc., and these imperfections were, in general, smaller than those on the film deposited on the (111)B face.

The process according to this example is applicable to the other III–V compounds described above. The process is suitably carried out within a temperature range of from 135° C. to 1200° C. in the reaction zone. The specific temperature employed will, of course, depend upon the specific compound involved. The temperature in the second temperature zone, i.e., the deposition zone ranges from 130° C. to 1500° C. In moving the reaction mixture from the first temperature zone to the second temperature zone there is a temperature differential of from 5° C. to 1365° C. and, preferably, from 25° C. to 200° C. In general, the second temperature zone will be cooler than the first temperature zone, an exception being in the case of boron phosphide wherein the second temperature zone must be higher than the first temperature zone. The specific temperatures employed will depend, of course, upon the specific compound reacted, but, in general, will be such that the hydrogen halide gas will react with the III–V compound in the first temperature zone and in the second temperature zone will be sufficiently cool to deposit the III–V compound as an epitaxial film on the described seed crystal substrate.

*Example II*

This example illustrates that process wherein at least one volatile compound of Group IIIB elements reacted together with at least one volatile compound of Group VB elements in the presence of hydrogen produces an epitaxial film according to the present invention.

A polished seed crystal of n-type gallium arsenide weighing 2.88 g. and containing $5.8 \times 10^{18}$ carriers/cc. of tellurium dispersed therein in place in a fused silica reaction tube located in a furnace, similar to the reaction tube in Example I except the present example utilizes a single furnace. The gallium arsenide seed crystal is placed on a graphite support inside said tube with the (100) crystallographic face exposed. The reaction tube is heated to 1000° C. and a stream of hydrogen is directed through the tube for 15 minutes to remove oxygen from the surface of the gallium arsenide.

A stream of hydrogen is then directed through a reservoir of gallium trichloride maintained at about 130° C. thus vaporizing the gallium trichloride which is then carried by the hydrogen through a heated tube from the reservoir to the reaction tube containing the gallium arsenide seed crystal.

Meanwhile, separate and equal streams of hydrogen are conducted through separate tubes containing in one of them a reservoir of arsenic trichloride heated to about 100° C. and in the other a body of zinc chloride (as dopant) heated to about 260° C. From the heated tubes the arsenic trichloride and zinc chloride are carried by the hydrogen on through the tubes to the reaction tube.

In the system the mole fractions of the gallium trichloride, arsenic trichloride and hydrogen are 0.05, 0.15 and 0.80, respectively. The separate streams of vaporized arsenic trichloride, gallium trichloride and zinc chloride conjoin in a fused silica reaction tube where a reaction occurs between the arsenic and gallium in which a single crystal film of p-type gallium arsenide is formed on the seed crystal of n-type gallium arsenide forming thereon an epitaxial layer which exhibits about $10^{18}$ carriers (holes) per cc. The seed crystal after 5 hours weighs 3.44 g.

X-ray diffraction patterns of the substrate crystal show that the deposited layer is single crystal in form and oriented in the same fashion as the substrate.

Pont contact rectification tests show that a p-n junction exists at the region of the junction between the epitaxial layer in the seed crystal substrate. Applicable temperatures to which the present process is amenable range from 400 to 1500° C., the specific temperatures employed depending upon the specific reaction system.

*Example III*

This example illustrates that process wherein at least one volatile compound of Group IIIB elements reacted with at least one element selected from Group VB in the presence of hydrogen produces an epitaxial film according to the present invention.

The procedure and apparatus described in the preceding example is repeated except that the seed crystal used is p-type indium phosphide containing about $5.1 \times 10^{17}$ carriers/cc. of cadmium dispersed therein and oriented in the (100) exposure. The reservoir containing the III–B compound, i.e., methyl aluminum dichloride, also contains sufficient tin tetrachloride doping agent to dope the subsequently formed aluminum arsenide to a carrier concentration of about $1 \times 10^{20}$ carriers/cc. The VB element used in this example is elemental arsenic contained in a tube heated to 540° C. while passing a stream of hydrogen therethrough, while the methyl aluminum dichloride and tin tetrachloride are heated to 20° C. in a stream of hydrogen. The separate streams of hydrogen containing the vaporized reactants are then conducted to the reaction tube which is heated to 1000° C. and contains the indium phosphide seed crystal. Here, the vaporized reactants intermix forming aluminum arsenide containing the tin doping agent dispersed therein. This product deposits on the indium phosphide seed crystal as an epitaxial film having the same lattice configuration as the seed crystal. X-ray diffraction patterns of the substrate crystal show that the deposited layer is single crystal in form and oriented in the same manner as the substrate. Point contact rectification tests show the presence of a p-n junction as in the preceding examples.

In this process suitable temperatures are within the range of from 500° C. to 1500° C. depending upon the specific compounds and elements reacted. In the preceding examples any of the compounds within the class described as epitaxial films according to this invention are also suitably employed as the seed crystal substrate.

Suitable volatile Group IIIB and/or Group VB compounds useful as starting materials in the processes described in Examples I and II include the halides (e.g., chlorides, bromides and iodides), hydrides, alkyl and haloalkyl compounds of boron, aluminum, gallium, indium, arsenic and phosphorus.

*Example IV*

The present example illustrates the production of an epitaxial film of a III–V compound by the interaction of a reaction mixture comprising a hydrogen halide and Group III element with a gaseous mixture of hydrogen and a Group V element or volatile Group V compound.

A polished seed crystal of n-type gallium arsenide weighing 2.98 g. and containing $5.8 \times 10^{18}$ carriers/cc. of tellurium dispersed therein is placed in a fused silica reaction tube located in the furnace. The gallium arsenide seed crystal is oriented with the (100) crystal face exposed and is placed on a graphite support inside said tube. The reaction tube is heated to 450° C. Meanwhile, a separate reservoir containing a quantity of a Group III element, gallium, is heated to a temperature of 500° C. A quantity of hydrogen chloride is passed through the gallium reservoir at a flow rate of approximately 10–30 cc./min. thereby forming a reaction mixture of gallium chlorides and hydrogen chloride. Meanwhile, in a separate reservoir containing a Group V element (or volatile Group V compound), for example, elemental arsenic, a stream of hydrogen is passed through this reservoir at a temperature of 525° C. to form a gaseous mixture of hydrogen and elemental arsenic. The gaseous mixtures from two reservoirs are then led into the reaction tube in which the gallium arsenide seed crystal is situated. These gaseous mixtures intermingle and gallium arsenide of p-type conductivity (by the inclusion in the gallium reservoir of a quantity of zinc chloride) is deposited as an epitaxial layer on the n-type gallium arsenide seed crystal.

*Example V*

A polished seed crystal of p-type gallium phosphide containing $5.5 \times 10^{18}$ carriers/cc. of zinc dispersed therein and oriented (100) is placed in a fused silica reaction tube. The tube is heated to 1000° C. and a stream of hydrogen is directed through the tube for 15 minutes to remove any oxygen present.

A mixture of gallium trichloride and indium trichloride is placed in a reservoir in a tube leading to the reaction tube and a body of phosphorus trichloride is placed in another tube connected to the reaction tube. The phosphorus trichloride contains about 0.1% of sulfur monochloride.

A stream of hydrogen is then directed through the reservoir containing the mixture of III–B halides and heated to about 130° C., while a stream of hydrogen is then passed through the phosphorus trichloride reservoir in the other tube heated to about 60° C. The vaporized components in both tubes are then carried by the hydrogen to the reaction tube containing the gallium phosphide seed crystal. In the reaction tube heated to 1000° C., the vaporized gallium chloride-indium chloride mixture combines and reacts with the hydrogen, vaporized phosphorus trichloride and sulfur chloride to form a mixed binary crystal of gallium indium phosphide which deposits from the vapor phase in single crystal form as an epitaxial film on said (100) oriented p-type gallium phosphide seed crystal. The n-type mixed crystal layer has a smooth mirror polished and is shown by X-ray diffraction patterns to have the same crystal orientation as the seed crystal, characteristic of epitaxial layers.

Rectification tests establish the existence of a p-n junction between the epitaxial layer and the substrate.

By varying the hydrogen flow rates through the respective IIIB and VB compound reservoirs according to this example, epitaxial films of ternary compositions over the whole range of $Ga_xIn_{1-x}P$ are obtained, where $x$ has a value less than 1 and greater than zero.

In accordance with the present embodiment of this invention, epitaxial films of ternary compositions of IIIB–VB elements may be prepared merely by reacting one volatile compound of Group IIIB elements with two Group VB compounds or vice versa, i.e., by reacting two Group IIIB compounds with one Group VB compound in the presence of hydrogen. Thus, epitaxial films of these ternary compositions may be formed by reacting a sum of three Group IIIB compounds and Group VB compounds in any combination in the presence of hydrogen.

*Example VI*

This example illustrates the preparation and deposition of epitaxial films of quaternary mixed binary crystals of III–V elements on (100) oriented seed crystals.

A mixture of gallium and indium trichlorides is placed in one reservoir and a mixture of arsenic trichloride and phosphorus trichloride containing a small amount of tellurium tetrachloride is placed in a second reservoir. Both reservoirs are connected to a quartz tube containing a polished seed crystal of zinc-doped GaAs oriented (100). This arrangement may be varied a number of ways, e.g., by placing each reactant in separate reservoirs along a common conduit to the reaction tube or each reservoir may have its own conduit to the reaction tube.)

The reservoir containing the gallium and indium trichlorides is then heated to about 130° C. and the reservoir containing the tellurium tetrachloride-doped phosphorus trichloride-arsenic trichloride mixture is heated to about 100° C. while hydrogen streams are directed through both tubes. The vaporized components in both reservoirs are then conducted by the hydrogen through quartz tubes to the reaction tube which is heated to about 1100°–1150° C. The separate streams of hydrogen carrying the reactants converge in the reaction tube where the gallium and indium trichlorides are reacted with the phosphorus and arsenic trichlorides containing tellurium tetrachloride for about 1 hour in the presence of hydrogen to form a four-component mixed binary crystal having the formula $Ga_{0.7}In_{0.3}As_{0.1}P_{0.9}$ which deposits as an epitaxial film on the GaAs seed crystal.

This product having a (100) oriented gallium arsenide substrate of p-type conductivity and a mirror smooth epitaxial film of n-type conductivity exhibits rectification suitable for use in semiconductor devices.

Similarly, other four-component mixed binary crystals of III–V compounds may be deposited as an epitaxial film merely by reacting in the presence of hydrogen at least one volatile Group VB compound and at least one volatile Group IIIB compound, provided that the sum of the IIIB compounds and the VB compounds reacted equals four. That is, one, two or three Group IIIB compounds may be reacted with, respectively, three, two or one Group VB compounds in the presence of hydrogen to produce epitaxial films of the quarternary compositions of III–V elements in this embodiment of the present invention.

*Example VII*

This example illustrates the procedure for producing a product having a plurality of layers of different electrical properties on (100) oriented seed crystals.

The procedure here is similar to that followed in the preceding example, and the apparatus is the same.

The reservoir containing the IIIB compound, gallium triiodide, is heated to 350° C. in a stream of hydrogen, while the tube containing a reservoir of arsenic triiodide is heated to about 390° C. in a stream of hydrogen and a separate tube containing $ZnCl_2$ is heated to about 360° C. in a stream of hydrogen. These separate streams of hydrogen containing the vaporized reactants are conducted to the reaction tube which contains a seed crystal of n-type indium arsenide doped to a carrier concentration of about $5.8 \times 10^{18}$ atoms/cc. of selenium and oriented (100). In the reaction tube previously flushed with hydrogen and heated to 900° C., the gallium triiodide reacts with the hydrogen, arsenic triiodide and zinc chloride dopant to form p-type gallium arsenide which deposits from the vapor phase onto the n-type indium arsenide seed crystal. The reaction proceeds for about 15 mnutes, after which the flow of the separate streams of hydrogen is discontinued temporarily. A fresh supply of arsenic triiodide doped with a trace amount of tellurium tetraiodide is added to replace the original arsenic source.

After the fresh source of arsenic triiodide is charged to the system, the hydrogen supply is again opened to stream through the IIIB compound reservoir, again heated to 350° C. and the arsenic triiodide-tellurium tetraiodide source heated to 390° C. Again, the vaporized reactants are carried by the hydrogen to the reaction tube heated to 1000° C. In the reaction tube the gallium triiodide reacts with the doped arsenic triiodide to form n-type gallium arsenide which deposits upon the p-type gallium arsenide layer previously deposited on the n-type indium arsenide seed crystal.

After the reaction has proceeded to completion, the product, upon examination is found to consist of a substrate of n-type indium arsenide oriented (100), having successive layers of p-type gallium arsenide and n-type gallium arsenide. These deposited layers exhibit the same X-ray orientation pattern as the substrate, indicating the same orientation and single crystal form characteristic of expitaxial films.

The product further exhibits characteristic n-p-n junction properties showing the presence of an n-p junction between the n-type gallium arsenide and the p-type gallium arsenide and a p-n junction between the latter compound and the n-type indium arsenide substrate. When this example is repeated substituting gallium phosphide for indium arsenide, substantially similar results are obtained.

By this method any number and combination of epitaxial and non-epitaxial layers may be deposited one upon the other.

An alternative to the foregoing procedure is to connect a fourth tube containing a second IIIB compound reservoir and hydrogen supply to the reaction tube at a point near the junction of the tube containing the first IIIB compound reservoir and the tube containing the VB compound reservoir. The fourth tube is closed off during the first phase of the process, i.e., while the first epitaxial layer is being formed, and thereafter, opened to the system while closing off the tube containing the first IIIB compound.

A still further modification of this procedure is to use a mixture of Group IIIB compounds in one or more reservoirs and/or a mixture of the Group VB compounds in another reservoir(s) and proceed in the same manner.

In each of these processes for forming reaction mixtures from which epitaxial films of III–V compounds are deposited, the resultant product wherein the seed crystal substrate is oriented in the (100) crystal face exposure is characterized as having reproducibly high polish, uniform film thickness and electrical properties of high mobilities and low resistivities.

Various electronic devices to which these improved epitaxially filmed semiconductor components are applicable include diodes (e.g., tunnel diodes), parametric amplifiers, transistors, high frequency mesa transistors, solar cells, thermophotovoltaic cells, components in micromodule circuits, rectifiers, thermoelectric generators, radiation detectors, optical filters, watt-meters and other semi-conductor devices.

Various other modifications of the instant invention will be apparent to those skilled in the art without departing from the spirit and the scope thereof.

I claim:

1. Process for the production of improved epitaxial films of compounds selected from the group consisting of the phosphides and arsenides of aluminum, gallium and indium and mixtures thereof, which comprises contacting a crude source of at least one of said compounds with a vapor comprising hydrogen halide and elemental hydrogen at a first temperature within the range of from 135° C. to 1200° C. to react said compound(s) with said hydrogen halide, and contacting the resulting gaseous mixture with the (100) crystallographic face of a seed crystal of at least one of said compounds at a second temperature within the range of from 130° C. to 1500° C. to deposit at least one layer of a single crystal form of at least one of said compound(s) as an epitaxial film onto said seed crystal.

2. Process for the production of improved epitaxial films of compounds having modified electrical conductivity, said compounds being selected from the group consisting of the phosphides and arsenides of aluminum, gallium and indium and mixtures thereof, which comprises contacting a crude source of at least one of said compounds with a vapor comprising hydrogen halide and elemental hydrogen in the presence of a small amount of doping agent at a first temperature within the range of from 135° C. to 1200° C. to react said compound(s) with said hydrogen halide, and contacting the resulting gaseous mixture with the (100) crystallographic face of a seed crystal of at least one of said compounds having one conductivity type, at a second temperature within the range of from 130° C. to 1500° C. to deposit at least one layer of a single crystal form of at least one of said compound(s) having different conductivity type as an epitaxial film onto said seed crystal.

3. Process for the production of improved epitaxial films of gallium arsenide which comprises contacting a crude source of gallium arsenide with a vapor comprising hydrogen halide and elemental hydrogen at a temperature within the range of from 700° C. to 1200° C. and subjecting the resulting gaseous mixture to a second and lower temperature within the range of from 500° C. to 1195° C., there being a temperature differential between said first and second temperatures of from 5° C. to 700° C., and contacting said reaction mixture with the (100) crystallographic face of a seed crystal of gallium arsenide to deposit an epitaxial film of single crystal gallium arsenide onto said seed crystal.

4. Process for the production of improved epitaxial films of gallium arsenide having modified electrical conductivity which comprises contacting a crude source of gallium arsenide with a vapor comprising hydrogen halide and elemental hydrogen in the presence of a small amount of doping agent at a temperature within the range of from 700° C. to 1200° C. and subjecting the resulting gaseous mixture to a second and lower temperature within the range of from 500° C. to 1195° C., there being a temperature differential between said first and second temperatures of from 5° C. to 700° C., and contacting said reaction mixture with the (100) crystallographic face of a seed crystal of gallium arsenide of one conductivity type to deposit an epitaxial film of single crystal gallium arsenide of different conductivity type onto said seed crystal.

5. Process according to claim 4 wherein said doping agent is an element selected from Groups II and VI of the periodic system.

6. Process according to claim 5 wherein said doping element is zinc to provide an epitaxial film having p-type conductivity.

References Cited in the file of this patent

UNITED STATES PATENTS

| | | |
|---|---|---|
| 2,692,839 | Christensen et al. | Oct. 26, 1954 |
| 2,858,275 | Folberth | Oct. 28, 1958 |

FOREIGN PATENTS

| | | |
|---|---|---|
| 1,029,941 | Germany | May 14, 1958 |

OTHER REFERENCES

Baker et al.: "Incorporation of As Into Vapor-Grown Ge," IBM Journal of Research and Development, vol. 4, No. 3, July 1960, pp. 275–279.

Anderson: "Germanium-Gallium Arsenide Heterojunctions," IBM Journal of Research and Development, vol. 4, No. 3, July 1960, pp. 283–287.

Antell et al.: "Preparation of Crystals of InAs, InP, GsAs, and GzP by Vapor Phase Reaction," Journal of the Electrochemical Society, vol. 106, June 1959, pp. 509–510.

UNITED STATES PATENT OFFICE

CERTIFICATE OF CORRECTION

Patent No. 3,146,137 August 25, 1964

Forrest V. Williams

It is hereby certified that error appears in the above numbered patent requiring correction and that the said Letters Patent should read as corrected below.

Column 3, line 8, strike out "be"; column 6, line 54, for "in", first occurrence, read -- is --; column 7, line 14, for "Pont" read -- Point --.

Signed and sealed this 22nd day of December 1964.

SEAL)
Attest:

ERNEST W. SWIDER
Attesting Officer

EDWARD J. BRENNER
Commissioner of Patents